United States Patent [19]

Lapeyre

[11] Patent Number: 5,101,966
[45] Date of Patent: Apr. 7, 1992

[54] END-TO-END MOLDED CONVEYOR BELT MODULES

[75] Inventor: James M. Lapeyre, New Orleans, La.

[73] Assignee: The Laitram Corporation, New Orleans, La.

[21] Appl. No.: 355,802

[22] Filed: May 22, 1989

Related U.S. Application Data

[62] Division of Ser. No. 110,109, Oct. 15, 1987, abandoned, which is a division of Ser. No. 642,535, Aug. 20, 1984, abandoned.

[51] Int. Cl.$^5$ ............................................. B65G 15/42
[52] U.S. Cl. ................................. 198/803.14; 198/822; 198/853
[58] Field of Search ...................... 198/822, 851–853, 198/803.14, 690.2, 698, 699.1

[56] References Cited

U.S. PATENT DOCUMENTS

| | | | |
|---|---|---|---|
| 3,870,141 | 3/1975 | Lapeyre et al. | 198/853 |
| 4,159,763 | 7/1979 | Kewley et al. | 198/853 |
| 4,194,300 | 3/1980 | Swanson et al. | 198/822 |
| 4,213,527 | 7/1980 | Lapeyre et al. | 198/853 |
| 4,556,142 | 12/1985 | Lapeyre | 198/822 |

FOREIGN PATENT DOCUMENTS 175483 3/1986 European Pat. Off. ............ 198/853

OTHER PUBLICATIONS

Design News, David J. Bak, p. 122, Jun. 9, 1980.

Primary Examiner—Joseph E. Valenza
Attorney, Agent, or Firm—Laurence R. Brown; James T. Cronvich

[57] ABSTRACT

A module for forming by a simple two-piece mold, a conveyor belt of integral plastic molded construction and having a conveying surface of selected cross-sections is disclosed. The module includes a first plurality (22) of pivot ends joined to a second plurality (24) of pivot ends by an intermediate section (34). Each of the first and second pluralities of pivot ends define apertures (26, 30) suitable for receiving a pivot rod (16, 18, 20). The intermediate section (34) joins and connects the first and second pluralities of pivot ends (22, 24) such that the pivot axis (26, 28, 32) formed by aligning the first pluralities and second pluralities of apertures respectively are maintained parallel to each other and define a common plane (36). Each of the modules receives a driving force such as a tooth (40) for moving the module orthogonal to the pivot axis (28, 32) and substantially parallel to the common plane (36). Each of the modules are designed and formed such that every surface on the module except the surface defining the pivot apertures (26, 30) may be observed by viewing along first and second pluralities of lines of sight as indicated by lines of sight arrows (52 and 54). The first and second pluralities of lines of sight are each perpendicular to pivot axis (26, 30) and are parallel to the common plane (36). Partially hexagon shaped channels (184, 186, 188) are integrally formed with the elongated portions of the module to form channels for carrying tubular items (206, 208).

10 Claims, 5 Drawing Sheets

END-TO-END MOLDED CONVEYOR BELT MODULES

This application is a division of application Ser. No. 110,109, filed Oct. 15, 1987 now abandoned, which is a division of Ser. No. 06/642,535 filed Aug. 20, 1984 now abandoned.

TECHNICAL FIELD

This invention relates to a conveyor belt formed of modules having a conveying surface of a selected cross-section including a channel shaped surface for conveying tubular or cylindrically stacked items and wherein the pivot ends of a module is joined by intermediate sections to form elongated portions and wherein the elongated portions are themselves joined by cross-members. More specifically, the invention relates to modules for forming a conveyor belt which can be formed by a simple two piece injection mold.

BACKGROUND OF THE APPLICATION

A typical modular conveyor belt is disclosed in U.S. Pat. No. 3,870,141 issued to J. M. Lapeyre on Mar. 11, 1975. According to this patent, identical modules formed by injection molding are pivotally connected to one another to form a conveyor belt of a desired length and width. Each module includes a plurality of elongated elements, each of which has a first pivot end and a second pivot end. The plurality of elongated elements are connected together such that apertures defined in each of the first and second pivot ends lie along a first and second pivot axes respectively, which pivot axes are parallel one to the other. The pivot ends of one module are intermeshed and pivotally connected by means of a pivot rod to the pivot ends of another module until an entire belt having a desired length and width is formed. The plastic belt built according to the teachings of this invention has been well received by industry and has many particular uses. The module itself is typically injection molded out of plastic by means of a simple two-piece mold which includes two "halves". One "half" typically molds the bottom portion of the module and the other half typically molds the top portion. In such simple two piece molds, however it will be appreciated that it is impossible to mold complex upper conveying surfaces and at the same time eliminate all excess plastics since such molding would result in undercuts and make it impossible for the mold halves to separate.

U.S. Pat. No. 4,171,045 issued on Oct. 16, 1979 also to J. M. Lapeyre recognized the need for including a conveying surface which would not allow objects riding on the conveyor surface to slip and thereby allow the belt to pass underneath. The belt disclosed and formed by the teachings of U.S. Pat. No. 4,171,045 is similar to that of the U.S. Pat. No. 3,870,141 discussed heretofore except that selected ones of elongated members include a plurality of "dogs" which extend above the normal portion of the conveying surface to contact and push articles on the conveying surface such that the belt will not slip underneath. However, it can be seen that such a conveying surface is still rather simple and can readily be injection molded by mold halves, one-half of which molds the bottom portion of the module and the other half which molds the top half.

In a similar manner, U.S. Pat. No. 4,213,527 issued June 22, 1980 to Lapeyre, et al, further discloses a module for forming a link conveyor belt which has ridges or flight members extending transverse to the direction of travel for preventing the conveyor belt from slipping under articles riding on the conveyor surface. A study of this patent, discloses that the particular modules maybe molded by an extrusion process and then the link ends cut in by blades. Similarly, U.S. Pat. No. 4,170,281 issued on Oct. 9, 1979 and 4,080,842 issued on Mar. 28, 1978, both to Lapeyre, also show conveying belts having members extending transverse to the conveying surface for moving articles on the conveying surface along the belt such that the belt cannot slip underneath the article. Again, these patents may readily be molded by a simple two-piece mold one-half of which molds the bottom half of the module and the other half molds the top half of the module.

Still other module link conveyor belt patent applications by Lapeyre and/or owned by the same assignee as the present invention which might be considered relevant to the present invention include: Ser. No. 483,210 entitled "Link Chain Belt" filed Apr. 14, 1983 now U.S. Pat. No. 4,993,543; Ser. No. 179,523 entitled "Modular Center Drive Conveyor Belt" filed Aug. 19, 1980 now U.S. Pat. No. 4,832,187, May 23, 1989; and Ser. No. 457,482 entitled "Lightweight Modular Conveyor Belt" filed Jan. 12, 1983 now U.S. Pat. No. 4,821,872, Dec. 3, 1985. In addition, two patent applications entitled "Conveyor Belt Having Insertable And Selectable Conveying Members" now U.S. Pat. No. 4,832,183, May 23, 1989 and "Conveyor Belt Having A High Friction Conveying Surface" filed concurrent with the present application now U.S. Pat. No. 4,925,013, May 15, 1990 disclose subject matter having some similarity to the present application.

Thus, a review of the prior art patents as well as pending applications of the assignee of the present invention reveals that except for the module formed by the extrusion process described in U.S. Pat. No. 4,213,527 discussed heretofore, to date all molding of conveyor belt modules has been by the two-piece molding process wherein the one-half of the mold molds the bottom portion of the module and the other half of the mold, molds the top portion of the module. Further, by such an injection molding technique it is not possible to mold a complex upper conveying surface. Therefore, it is an object of this invention to provide a module for forming a conveyor belt which belt has a complex upper conveying surface.

It is another object of the present invention to provide a simple and inexpensive method of injection molding modules having a complex upper surface.

DISCLOSURE OF THE INVENTION

Other objects and advantages will be obvious and will in part appear hereinafter, and will be accomplished by the present invention which provides a module for forming a conveyor belt made of integral plastic molded construction. The module comprises a first plurality or group of pivot ends which are parallel to each other and which define a pivot aperture. The pivot apertures of this first plurality of pivot ends are all aligned along a first pivot axis. In a similar manner, there is a second plurality of parallel pivot ends each of which also define a pivot aperture and which apertures are aligned along a second pivot axis. The two pluralities of pivot ends are then connected and joined such that the first and second pivot axis are maintained parallel to each other and such that the pivot axes define a common plane. There is also included a means for receiving a driving force by the module such as a tooth for cooperating with a recess in a drive sprocket, or alternately a recess in the module for cooperating with a driving tooth extending from a sprocket. This means for receiving the driving force moves the module orthogonal to the pivot axis and substantially parallel to the common plane. According to this particular invention, the module is further formed such that every surface on the module, except surfaces defining the pivot apertures, may be observed by viewing along first and second pluralities of lines of sight. Each of the first and second pluralities of lines of sight are both perpendicular to the pivot axis and parallel to the common plane. The first plurality of lines of sight extend from the first pivot ends toward the second pivot ends. In a similar, but opposite manner, the second plurality of lines of sight extends from the second pivot ends and toward the first pivot ends. The modules may also be formed such that the first plurality of pivot ends are in register with like pivot ends of the second plurality, or alternately the first plurality of pivot ends may be laterally offset from the second plurality of pivot ends such that each pivot end of the first plurality is in register with the spaces between the pivot ends of the second plurality and vice-versa.

Also of particular importance is that the present module may be molded by a simple two-piece mold such that the intermediate section includes a conveying surface of many selected shapes which may be located on the upper side of the module. In particular, the conveying surface may form a channel having substantially any cross section including curved, and which extends both perpendicular to the pivot axis and parallel to the common plane. A conveying belt formed of modules defining such channels is particularly suitable for conveying items which define a tubular shape. In particular, such a conveying belt is suitable for conveying a series of a plurality of stacked disc-shaped items such as round cookies, coins, stampings, etc..

BRIEF DESCRIPTION OF THE DRAWINGS

The above features of the present invention will be more clearly understood from consideration of the following description in connection with the accompanying drawing in which.

THE BEST MODE FOR CARRYING OUT THE INVENTION

Figures 1, 2, 3A:
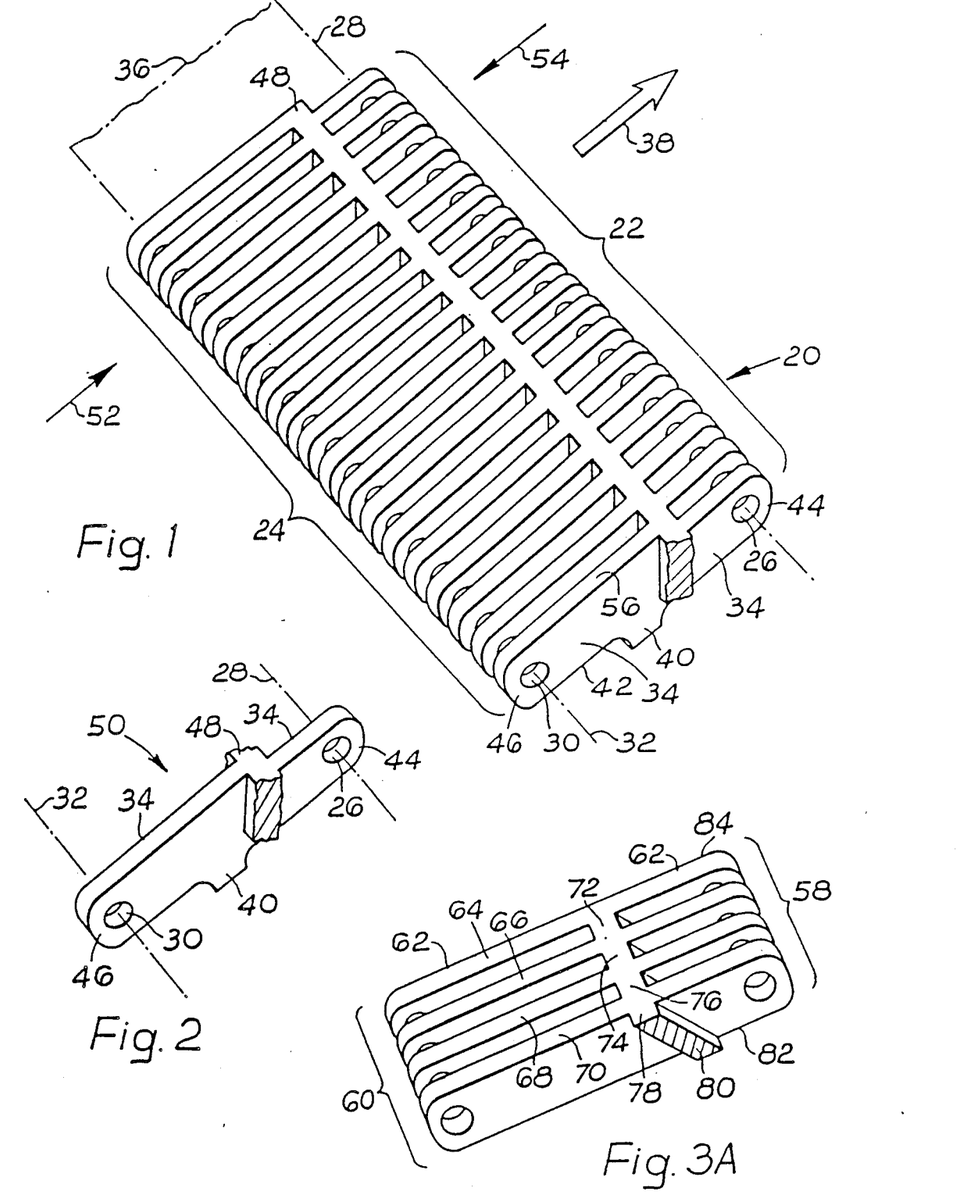
FIG. 1 shows a module of a conveyor belt incorporating the features of this invention.
FIG. 2 shows one of the elongated elements broken out of the module of FIG. 1.
FIGS. 3A, 3B, and 3C show a perspective view, a side view and a top view respectively of an alternate embodiment of the present invention wherein the two pluralities of pivot ends are not offset.

Referring now to FIG. 1, there is shown generally at 20 a perspective view of a portion of a module incorporating the features of this invention. As shown, module 20 includes a first plurality of pivot ends 22 and a second plurality of pivot ends 24. As shown, each of the first plurality of pivot ends 22 define apertures such as aperture 26 all of which are aligned along a first pivot axis 28. In a similar manner, each of the pivot ends 24 also define apertures such as aperture 30, and which are also all aligned along a second pivot axis 32. An intermediate section 34 connects and joins pivot ends 22 and 24 such that the first pivot axis 28 and the second pivot axis 30 are maintained parallel to each other and define a common plane 36. Each of the modules of this invention will also include some means for receiving a driving force such that the module may be moved orthogonal to the pair of pivot axis 28 and 30 and also in a direction substantially parallel to common plane 36. Hollow arrow 38 indicates the direction of motion of the module. In the embodiment shown in FIG. 1, the means for receiving the driving force is a tooth 40 which extends from the bottom side 42 of the module. Although, a driving tooth, such as tooth 40 may be included on the bottom portion of each of the intermediate sections comprising the module, it is only necessary that selected ones of the intermediate sections include a driving tooth 40. As is also clear in FIG. 1, intermediate section 34 in addition to joining a pair of pivot ends such as pivot ends 44 and 46 also include a series of cross portions represented generally by reference number 48 which maintain the first and second pivot ends parallel to each other and also separated at a selected spacing.

Referring now to FIG. 2, there is shown a single elongated section, generally indicated by reference number 50, which was taken or broken away from the module 20. As can be seen, each individual elongated portion or element 50 joins a pair of pivot ends 46 and 44 by means of the intermediate section 34 such that the tensile forces can be transmitted from between the two pivot axis 28 and 32.

Of significant importance to the present invention is that the module shown in FIG. 1 is designed such that every surface on the module, except those surfaces which define the pivot apertures, may be observed by viewing the module along first and second pluralities of lines of sight, such as lines of sight 52 and 54. Both of the first and second pluralities of lines of sight are perpendicular to the pivot axis 32 and both pluralities of the lines of sight are parallel to the common plane 36. In addition, the first plurality of lines of sight extend from the first plurality of pivot ends toward the second plurality of pivot ends, and the second plurality of lines of sight extend from the second plurality of pivot ends towards the first plurality of pivot ends. Thus, by meeting this criteria the modules may be formed by an injection molding process wherein the mold halves open and close in a direction parallel to the lines of sight, rather than the normal method of opening such molds in a direction perpendicular to the lines of sight and from the upper surface 56 and the lower surface 42.

Referring now to FIG. 3A, there is shown a perspective view of another embodiment of the present invention wherein the first plurality of link ends 58 and the second plurality of link ends 60 are joined by an intermediate section 62 which includes some elongated portions such as 64, 66, 68 and 70 and which are joined by cross-portions 72, 74, 76 and 78. It is also interesting to note that according to this embodiment, the cross-portion 72, 74, 76 and 78 which may be generally indicated as cross-rib 80 slopes from the bottom portion 82 closest to the pivot ends 58 toward the second plurality of pivot ends 60 at the top surface 84. In this manner and as will be discussed later the cross-rib 80 or the individual connecting portions such as 72, 74, 76 and 78 may be used as contact surfaces for cooperating with a driving tooth for providing the driving force to a belt made up of such modules.

Figure 3B:
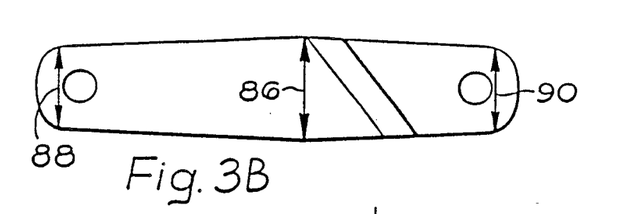
Figures 3C, 4A, 4B:
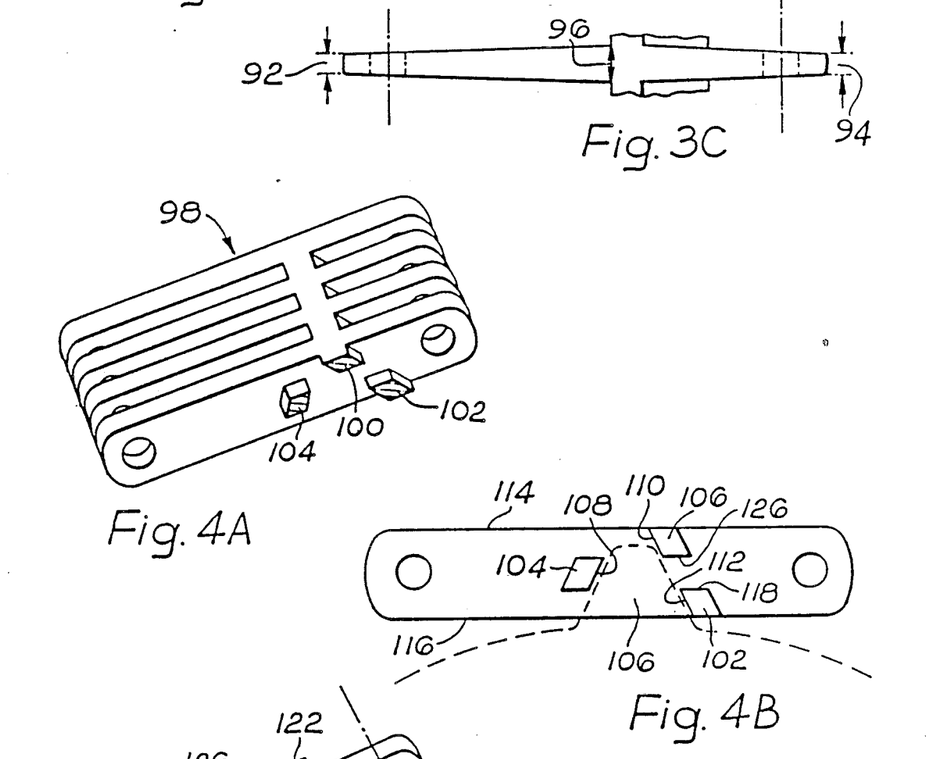
FIGS. 4A and 4B show a perspective view and a side view respectively of still another alternate embodiment of the present invention wherein the module is suitable for being driven in either of two directions.

FIGS. 3B and 3C show side and top views respectively of single elongated elements making up the module shown in FIG. 3A. As is more readily seen in FIG. 3B, the dimension represented by double-headed arrow 86 is greater than the two end dimensions represented by double headed arrows 88 and 90 respectively. In a similar manner and as shown in FIG. 3C, the end thickness represented by double-headed arrows 92 and 94 is smaller than the mid thickness represented by double-headed arrow 96. Although these differences in dimensions such as between broad dimension 86 compared to dimensions 88 and 90, and widths 92 and 94 when compared to 96 may be exaggerated in the FIGS. 3B and 3C it will be appreciated by those skilled in the art that such differences in dimensions is most desirable when forming the modules by an injection molding process by molds opening end to end to greatly increase the ability of removing the mold part from the two mold halves. That is, if dimensions 86, 88 and 90 were exactly the same, and if dimensions 92, 94 and 96 were exactly the same, removal of the molded module from the mold halves would be most difficult. Further, it will be appreciated that although the difference in such dimensions is not readily obvious in viewing FIG. 1, 2 and the remaining of the modules discussed hereinafter, it will be appreciated that such differences are desirable with respect to all of the modules discussed hereinafter to facilitate removal of the module from the mold halves.

Referring now to FIG. 4A, there is shown still another embodiment incorporating the features of this invention. As shown, the module 98 shown in FIG. 4A is substantially similar to the module shown in FIG. 3A except that instead of a single cross-rib 80, the module in 4A includes three smaller cross-ribs or cross-portions generally indicated as cross-portions 100, 102 and 104. Other than these cross-ribs, the module of FIG. 4A is the same as the module in FIG. 3A. FIG. 4B shows a side view of the module of FIG. 4A and further includes in phantom or dashed lines a tooth of a sprocket wheel suitable for driving a conveyor belt comprised of such modules. As can be seen, the tooth 106 of the sprocket wheel cooperates with contact surface 108 on cross-portion 104 and contact surfaces 110 and 112 on cross-portions 100 and 102 respectively. As will be discussed in more detail hereinafter, the provision of the cross-rib in this manner allows a belt formed of such modules to be driven in either direction. It is also important to note, that the cross-portions 100, 102 and 104 are so positioned between the upper surface 114 and the lower surface 116 of the module so that there is no overlap. That is, the thickness of cross-portion 104 is somewhat less than the distance between the top surface 118 of cross-portion 102 and the bottom surface 120 of cross-portion 100. It is necessary of course that the cross-portions do not overlap in order that the criteria concerning the two pluralities of lines of sight can be met and to assure that the mold halves may be opened.

Figure 5:
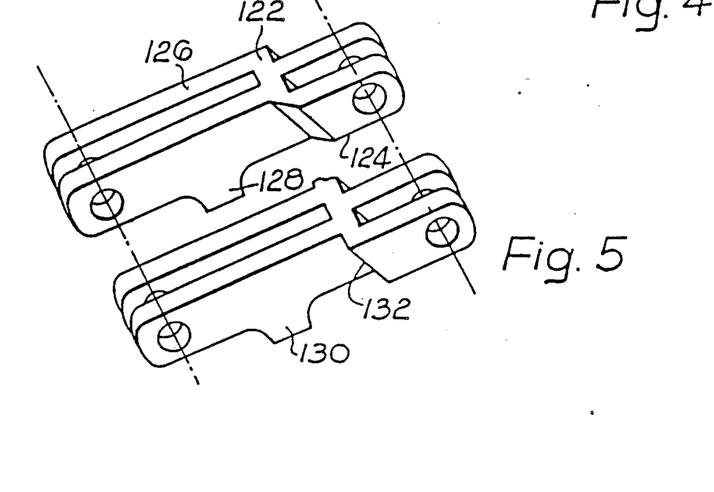
FIG. 5 shows yet another embodiment of the present invention similar to that shown in FIG. 1.

Referring now to FIG. 5, there is shown still another embodiment of a module according to the teachings of this invention. The module of FIG. 5 is substantially the same as that of FIG. 1, except that the cross-portion represented generally by reference number 122 as shown in FIG. 5 slopes from the bottom portion 124 to the top portion 126 in a direction opposite of that shown for the cross-portion of FIG. 1. Although not shown in detail, by including drive teeth such as teeth 128 and 130 on selected and spaced elongated elements, it is possible to use the contact surface of the cross-portion 122 such as the surface 132 as a contact surface for cooperating with a drive tooth such as discussed with respect to FIG. 4B. By such a design, a module such as that shown in FIG. 5 may be driven by two methods namely, by a tooth on the module such as teeth 128 or 130 or alternately by a tooth extending from a drive sprocket and cooperating with contact surface 132.

Figures 6, 7, 8:
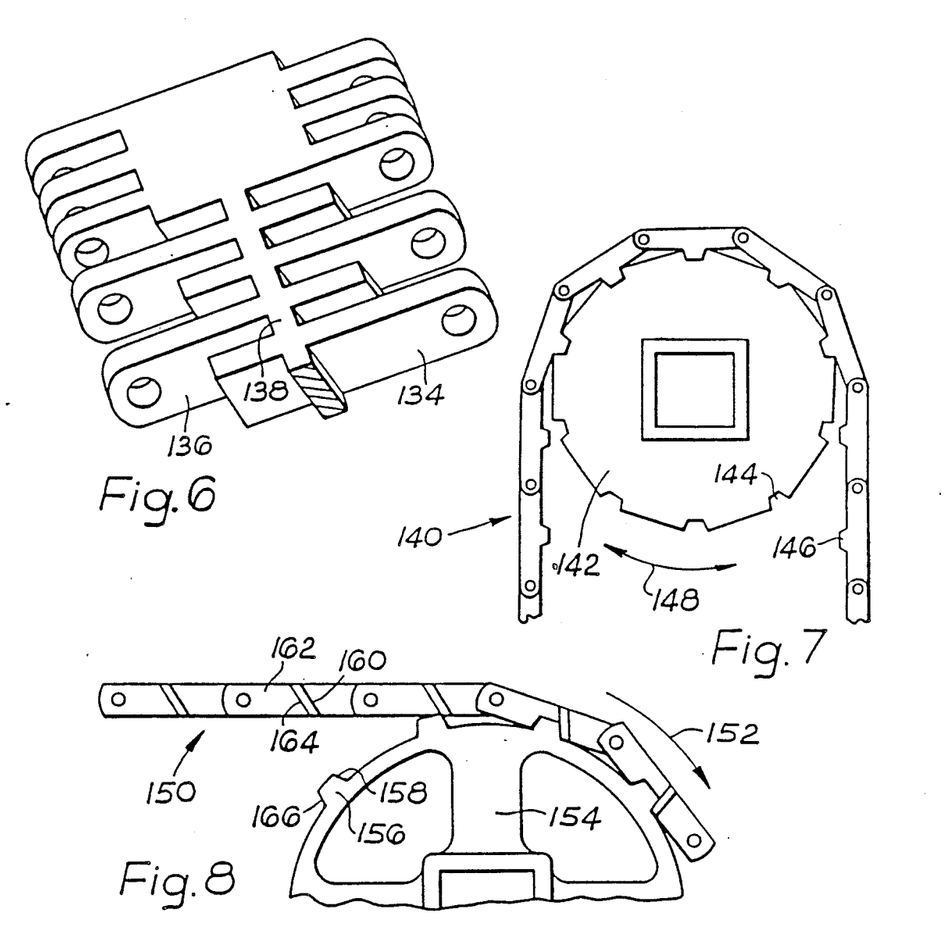
FIG. 6 shows still another embodiment of the present invention.
FIG. 7 shows a link belt made of modules of the types shown in FIGS. 1 or 5 cooperating with a sprocket wheel.
FIG. 8 shows a conveyor belt formed of modules of the type shown FIGS. 1, 3 or 4, cooperating with a sprocket.

FIG. 6 shows still another embodiment of a module incorporating the teachings of this invention. Although this hybrid module is believed not to be as desirable as those discussed heretofore, it serves to illustrate how modules of different structure may be formed to incorporate the teachings of the present invention. As can be seen from the module of FIG. 6, each of the pluralities of link ends such as link end 134 is joined to its cooperating link end such as link end 136 by either means of an intermediate connecting portion 138 or by having the intermediate elongated portions of the intermediate sections thick enough such that the two pivot ends may be attached and still remain offset.

Referring now to FIG. 7, there is shown a side view of a link belt formed of modules similar to that shown in FIGS. 1, 2 or 5, and represented by reference number 140, driven by a drive sprocket 142 which includes a series of recesses such as recess 144 for receiving the teeth found on the various link modules such as tooth 146. It will be appreciated by those skilled in the art, that a link belt of this type using drive teeth such as teeth 146 may be driven in either direction as indicated by double-headed arcuate arrow 148.

As shown in FIG. 8, there is a side view of a link belt shown generally at 150 suitable for being driven only in a single direction indicated by single-headed arcuate angle 152 by means of teeth on a sprocket 154 such as tooth 156. As can be seen, tooth 156 has a contact surface 158 which will make contact with the cross-portion 160 of link 162 at contact surface 164. Rotation of the sprocket 154 will thus result in moving of the belt 150 as shown by arcuate arrow 152. It is important to note that as mentioned above, according to this particular embodiment, the belt 150 may only be driven in the direction indicated by the arrow 152 as there is no contact surface at which the back surface 166 of tooth 156 could contact. Thus, back surface 166 may be of substantially any shape because of the unitary direction of drive of this belt and sprocket system. With respect to FIG. 8, however, referring again to FIG. 4B, there is shown, as was discussed heretofore, how a somewhat similar belt formed of modules of the type of FIG. 4A could be driven in both directions.

Figure 9:
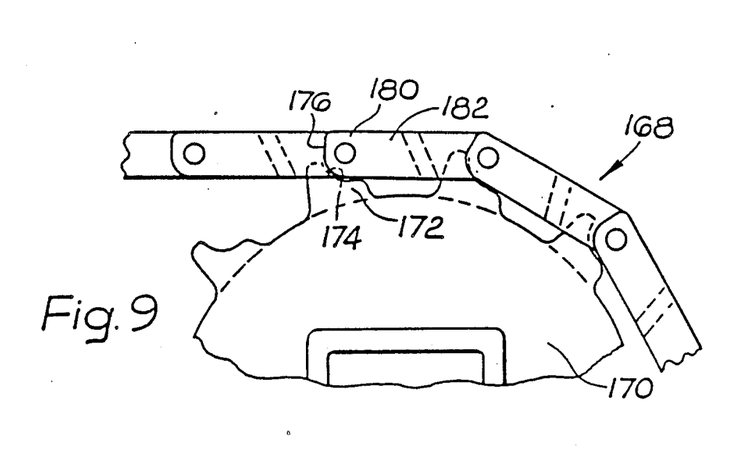
FIG. 9 shows a conveyor belt formed of modules of the type shown in FIGS. 3, 4 or 6 wherein the belt is driven by sprocket teeth cooperating with the pivot ends of the conveyor belt.

Referring now to FIG. 9, there is shown still another alternate embodiment of a modular belt represented generally by reference number 168 and which is driven by a sprocket wheel 170. The drive system shown in FIG. 9 could be used with respect to drive belts made up of modules similar to those shown in FIGS. 3A, 4A or 6. As shown, each of the teeth such as tooth 172 includes a contact surface 174 which cooperates with a contact surface 176 on the pivot end 180 of the module 182. Thus, it will be appreciated that belts formed of the various types of modules which may be formed according to the teachings of this invention may be driven by various types of drive system.

Figure 10A:
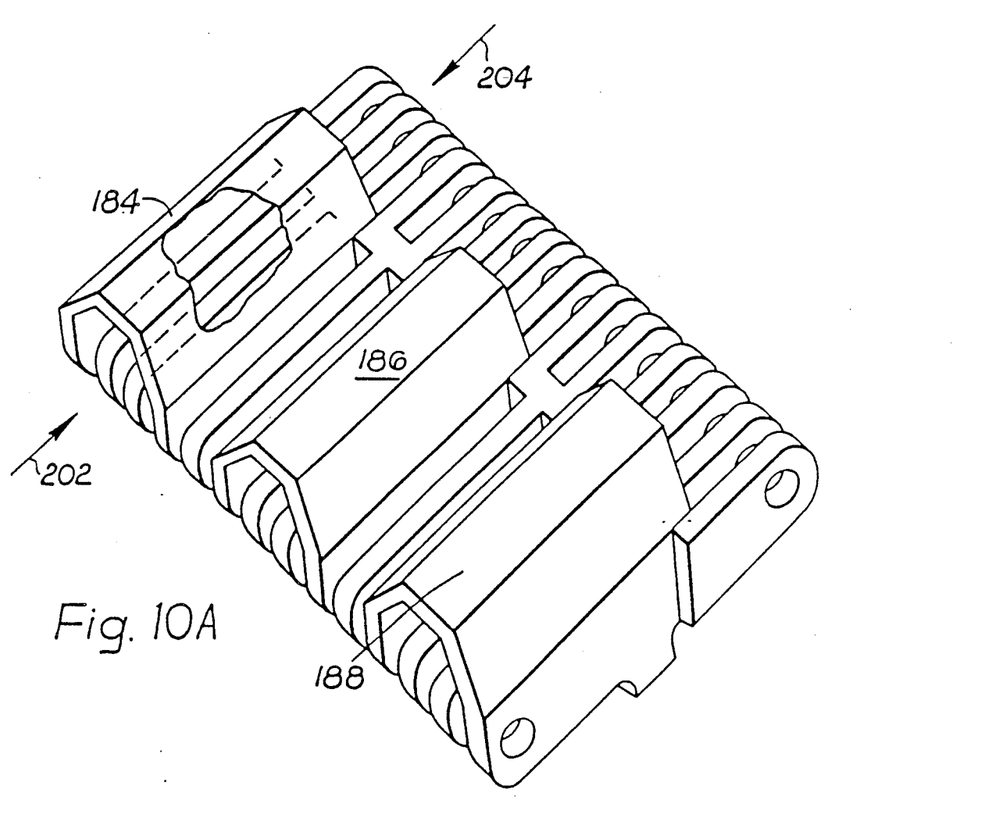
FIG. 10A shows a module similar to the type shown in FIG. 1 and further including a conveyor surface suitable for conveying tubular shaped items.
Figure 10B:
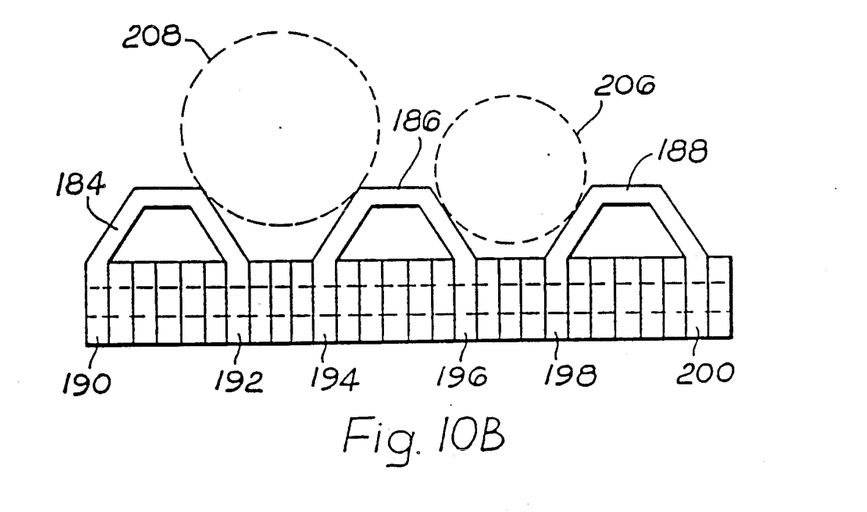
FIG. 10B shows the end view of the FIG. 10A and further shows by dashed lines how the module conveys tubular items.

Referring now to FIGS. 10A and 10B, there is shown a perspective and an end view respectively of a module incorporating the teachings of this invention. As can be seen, the modules shown in FIGS. 10A and 10B are substantially similar to that shown in FIG. 1 except they further include longitudinal member portions 184, 186 and 188. As can be seen, these longitudinal portions each represent three sides of an irregular hexagon in a sense that the three sides are not necessarily equal in length and the angles are not necessarily 60° and are integrally molded with certain ones of the elongated members comprised of intermediate sections and pivot ends. As can more readily be seen in FIG. 10B, hexagon portion 184 is integrally molded with the pivot end and intermediate portion making up elongated members 190 and 192. In a similar manner, hexagon portion 186 is integrally molded with member 194 and 196, and hexagon portion 188 is integrally molded with elongated member 198 and 200. It should also be observed, that in accordance with the previous teachings of the present invention and as is now indicated by lines of sight arrows 202 and 204, the module of FIGS. 10A and 10B can also be molded by means of a simple two-piece mold wherein the mold halves open from the respective ends rather than from the top and bottom of the module. Further, as can be more easily seen in FIG. 10B the modules of FIGS. 10A and 10B are particularly suitable for conveying tubular shaped items such as items 206 and 208 indicated by dashed lines and resting between hexagon portions 184 and 186, and 186 and 188 respectively.

Figure 11:
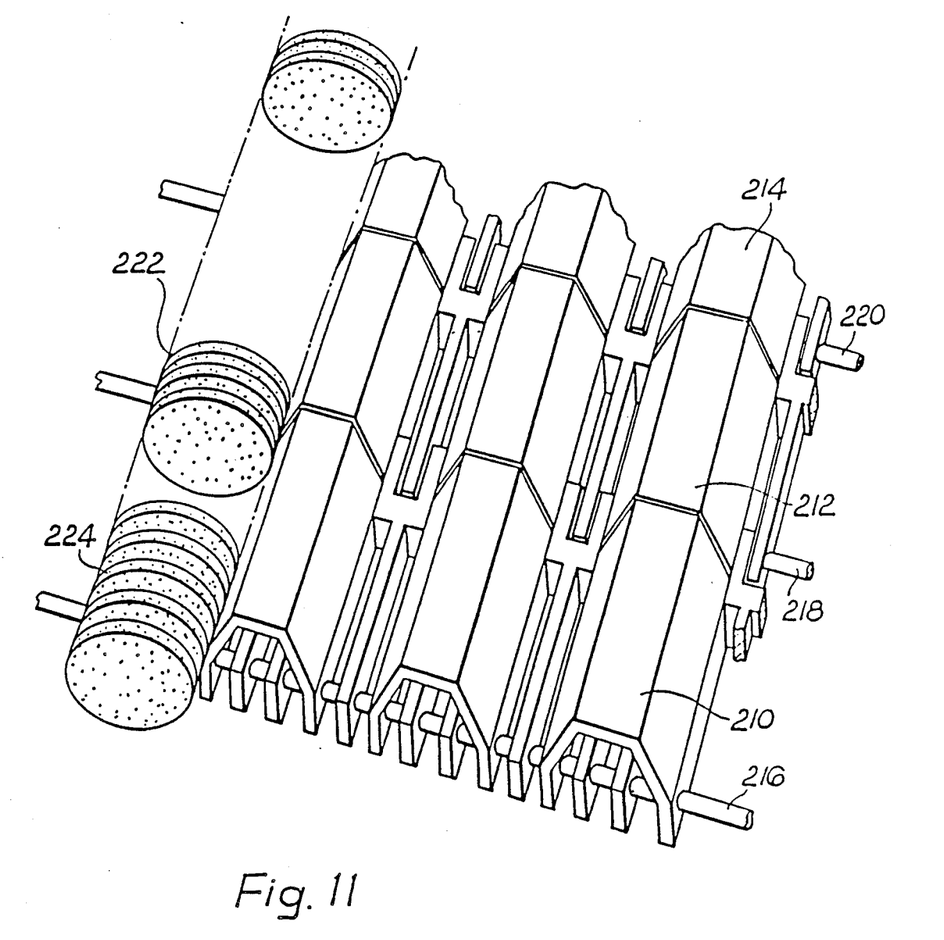
FIG. 11 is a perspective view of portions of three of the modules similar to that shown in FIG. 10A and illustrating how the conveyor belt conveys tubular shaped items including stacked disc items.

Referring now to FIG. 11, there are shown portions of three modules such as modules 210, 212 and 214 pivotally joined by pivot rods 216, 218 and 220. As can be seen, when a plurality of modules similar to those shown and discussed in FIGS. 10A and 10B are arranged end to end and pivotally joined, the channels created by the hexagon members form long channels which can be used for transporting or conveying long tubular shaped items. In addition, and as more specifically shown in FIG. 11 rather than being an individual item, the tubular shaped member may instead be formed of a plurality of stacked disc shaped items such as cookies shown at reference numbers 222 and 224. As will be appreciated by those familiar with the cookie manufacturing process, it is often desirable to stack the cookies on their edges end-to-end to allow for more complete and thorough cooling and/or freezing. The belt with these corrugated channels lends itself to conveying ball-like objects such as various kinds of fruit, since these objects may roll along the conveyor in the direction of travel of the conveyor but cannot roll sideways on the conveyor thereby falling off the conveyor. This allows these ball-like items to be conveyed in well defined rows, one behind the other and to some extent forms automatic columnating of the round objects.

Thus, it will be appreciated that although specific example of conveying belt modules have been described, all other types of modules which meet the two pluralities of lines of sight criteria described here-tofore are include within the scope of this invention and it is not intended that the specific references be considered as limitations upon the scope of the invention except insofar as set forth in the following claims.

I claim:

1. An integrally molded plastic module for interconnecting with similar modules to form a conveyor belt, said module having an upper side and a lower side and comprising:
    a first plurality of parallel pivot ends defining pivot apertures aligned along a first pivot axis;
    a second plurality of parallel pivot ends defining pivot apertures aligned along a second pivot axis;
    an intermediate section including first elongated portions connected to said first pivot ends and extending toward said second pivot ends and second elongated portions connected to said second pivot ends and extending toward said first pivot ends, said intermediate section further having an integral cross-portion, connecting said first and second elongated portions such that said first and second pivot axes are maintained parallel to each other and define a common plane;
    said module including means for defining at least one conveying channel surface integrally molded with said module, said at least one conveying channel having a selected cross-section and extending both perpendicular to said pivot axis and parallel to said common plane;
    at least one tooth integrally molded with said module to engage a drive sprocket for receiving a driving force to move said module orthogonal to said pivot axis and substantially parallel to said common plane; and
    every surface on said module, except surfaces defining parallel apertures such as said pivot apertures, located such that they may be observed by viewing along first and second pluralities of lines of sight, each of said first and second pluralities of lines of sight being both perpendicular to said pivot axis and parallel to said common plane, each one of said first pluralities of lines of sight extending from said first plurality of pivot ends toward said second plurality of pivot ends, and said second pluralities of lines of sight extending from said second plurality of pivot ends toward said first plurality of pivot ends.

2. The module of claim 1, wherein said first plurality of pivot ends is equal in number to said second plurality of pivot ends.

3. The module of claim 1, wherein said means for defining said conveying surface provides a member having a non-rectangular cross-section suitable for conveying items defining a tubular shape.

4. The module of claim 3 wherein said conveying surface has a cross-section for conveying items defining said items of tubular shape inclusive of a stacked plurality of disc shaped items.

5. A conveyor belt, having a conveying surface defining at least one channel extending in the direction of travel constructed from a multiplicity of modules suitable for being pivotally connected end-to-end and side-by-side to construct a belt of any selected length and width, said conveyor belt having an upper and a lower side and comprising:
- a multiplicity of similar integrally molded plastic modules, each of said similar modules comprising;
- a first plurality of parallel pivot ends defining pivot apertures aligned along a first pivot axis,
- a second plurality of parallel pivot ends defining pivot apertures aligned along a second pivot axis, said first plurality of each module suitable for intermeshing with said second plurality of another module such that said first pivot axes are aligned with said second pivot axes;
- an intermediate section including first elongated portions connected to said first pivot ends and extending towards said second pivot ends, and second elongated portions connected to said second pivot ends and extending toward said first pivot ends, said intermediate section further having an integral cross-portion connecting said first and second elongated portions such that said first and second pivot axes are maintained parallel to each other and define a common plane,
- at least one module including means for defining at least one conveying channel integrally molded on said at least one module, said at least one conveying channel having a selected cross-section and extending both perpendicular to said pivot axis and parallel to said common plane,
- means for receiving a driving force by at least some of said modules to move a plurality of said modules coupled as a conveyor belt orthogonal to said pivot axis and substantially parallel to said common plane;
- every surface on said module, except surfaces defining parallel apertures such as said pivot apertures being located such that they may be observed by viewing along first and second pluralities of lines of sight, each of said first and second pluralities of lines of sight being both perpendicular to said pivot axis and parallel to said common plane, each one of said first pluralities of lines of sight extending from said first plurality of pivot ends toward said second plurality of pivot ends, and each one of said second pluralities of lines of sight extending from said second plurality of pivot ends toward said first plurality of pivot ends; and
- a multiplicity of connecting rods for pivotally connecting said first pivot ends of each of said multiplicity of modules with said second pivot end of another one of said multiplicity of modules, said multiplicity of modules being connected end-to-end to construct a conveyor belt of a selected length.

6. The conveyor belt of claim 5, wherein said first and second pluralities of pivot ends are further pivotally connected to form an endless loop.

7. The conveyor belt of claim 5 wherein said plurality of modules are further arranged in a side-by-side relationship with other ones of said plurality of modules such that the pivot axes defined by said first plurality of pivot ends and said second plurality of pivot ends respectively are coaxial with respect to adjacent side-by-side modules, and such that said conveying surface of said belt defines a plurality of said conveying channels extending parallel to the direction of travel.

8. The conveyor belt of claim 5, wherein said first plurality of pivot ends is equal in number to said second plurality of pivot ends.

9. The conveyor belt of claim 5, wherein said means for defining said conveyor channel produces a conveying surface having a non-rectangular cross-section suitable for conveying items defining a tubular shape.

10. The conveyor belt of claim 9, wherein said conveying surface cross-section for conveying items defining said tubular shape is suitable for a stacked plurality of disc shaped items.

* * * * *